(12) United States Patent
Casati et al.

(10) Patent No.: US 7,529,762 B2
(45) Date of Patent: May 5, 2009

(54) WORKFLOW DATA WAREHOUSING

(75) Inventors: Fabio Casati, Palo Alto, CA (US);
Ming-Chien Shan, Saratoga, CA (US);
Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 691 days.

(21) Appl. No.: 10/230,926

(22) Filed: Aug. 28, 2002

(65) Prior Publication Data
US 2004/0044636 A1 Mar. 4, 2004

(51) Int. Cl.
*G06F 17/30* (2006.01)
(52) U.S. Cl. ............................ 707/102; 707/100; 705/1; 705/10
(58) Field of Classification Search .................... 707/1, 707/102, 100; 705/1, 10
See application file for complete search history.

(56) References Cited
U.S. PATENT DOCUMENTS

| | | | | |
|---|---|---|---|---|
| 5,940,804 | A * | 8/1999 | Turley et al. | ........ 705/9 |
| 6,041,306 | A | 3/2000 | Du et al. | |
| 6,078,982 | A | 6/2000 | Du et al. | |
| 6,631,354 | B1 * | 10/2003 | Leymann et al. | ........ 705/8 |
| 7,174,342 | B1 * | 2/2007 | Scheurich et al. | ....... 707/102 |
| 2002/0123957 | A1 * | 9/2002 | Notarius et al. | ........ 705/37 |
| 2003/0225769 | A1 * | 12/2003 | Chkodrov et al. | ....... 707/100 |

OTHER PUBLICATIONS

"Warehousing Workflow Data: Challenges and Opportunities" by Angelina Bonifati, Fabio Casati, Umesh Dayal, Min-Chien Shan; for Proceedings of the 2007th VLDB Conference, Roma, Italy, Sep. 11-14, 2001; pp. 1-4.*

"Improving Business Process Quality through Exception Understanding, Prediction, and Prevention" by by Angelina Bonifati, Fabio Casati, Umesh Dayal, Min-Chien Shan; for Proceedings of the 2007th VLDB Conference, Roma, Italy, Sep. 11-14, 2001; pp. 1-4.*

* cited by examiner

*Primary Examiner*—Apu M Mofiz
*Assistant Examiner*—Monica M Pyo

(57) ABSTRACT

A data management system includes forming a workflow data warehouse (WDW) for storing data indicative of facts specific to a workflow process. In one embodiment, the WDW is configured to categorize and store the workflow process data as generic or specific process data and as generic or specific node data. The process data are related to the execution of a sequence of workflow actions within the workflow process. The node data are related to the execution of a node within the workflow process. The WDW is formed within a workflow management system and is adapted for on-line analytical processing (OLAP). The WDW may be configured to store data associated with identifying specific behaviors within the workflow process. Moreover, the WDW is configured to enable vertical recordings of data associated with the modifications of the workflow process.

19 Claims, 6 Drawing Sheets

WORKFLOW DATA WAREHOUSING

TECHNICAL FIELD

The invention relates generally to managing data and more particularly to a method and system for managing process data.

BACKGROUND ART

Workflow Management Systems (WFMSs) are increasingly used by many companies to improve the efficiencies of business processes, thereby reducing costs and execution times. As one example, a WFMS may be employed to monitor activities related to manufacturing printers, with the diverse activities including those involving purchasing parts. In general, a WFMS logs events that occur during process executions, including the start and completion time of each activity, input and output data, and the resources that were used in executing the process. However, most WFMSs only offer basic log analysis functionality, such as identifying the number of processes completed in a given time period and computing their average execution time. In order to attain a more comprehensive report, the user must configure commercial reporting tools and write queries to the logs to retrieve the data of interest. While this approach does provide some basic reporting functionality, it requires a considerable configuration effort, since it is sometimes difficult to construct the "right" queries to extract the desired information. In addition, WFMSs are not designed for on-line analytical processing (OLAP) applications.

Another concern associated with storing process data is the need to properly categorize and/or organize multiple types of related facts. Workflow executions may generate different kinds of facts about the process activities, resources, and instances. The facts are related to each other, since they are all relevant to the same workflow process. However, the need to accommodate different types of facts may cause difficulties in avoiding data loss and in assuring an acceptable level of performance in informatively presenting the data that is stored.

What is needed is a method and system to more efficiently manage data that are related to process executions.

SUMMARY OF THE INVENTION

Managing data in accordance with the invention includes forming a workflow data warehouse (WDW) that is configured to store data to a workflow process. The workflow process is defined by at least one sequence of workflow actions. In one embodiment, the WDW is configured to categorize and store the workflow process data as process data and as node data. The process data are related to the execution of a sequence of workflow actions within the workflow process. The node data are related to nodes within the workflow process.

The WDW may be a generalized software package that is applicable to various WFMSs to collect and analyze workflow execution data. Thus, the WDW should be adaptable and scalable in order to be cooperatively coupled to complex WFMSs and to perform well under different conditions, such as different log sizes, different data loading situations, and different data aggregation requirements. The WDW may be particularly adapted for on-line analytical processing (OLAP).

The WDW includes multiple tables for storing the workflow process data, but data structures other than table structures may be used. In one implementation of the WDW, the warehouse includes a generic process data table and a generic node data table that are arranged as base tables within a star schema. The generic process data table is configured to store process data that are common to most work process models, as well as process data that are commonly needed for typical queries. Thus, this table may be considered to be "model-independent." The generic node data table is configured to store node data that are common to node types, so that this table may be considered to be "node type-independent." Node types include work nodes that each involve a workflow activity which contributes toward the accomplishment of the overall workflow process and route nodes that each involve a workflow activity in which a decision is made regarding the direction of processing within the overall workflow process. The generic node data table is used to store facts (attributes) that are common to the various node types and that are commonly needed to satisfy typical queries. In one embodiment, the general process data are stored in the generic process data table only upon completion of the related sequence of workflow actions. Similarly, the generic node data are stored in the generic node data table only upon completion of the workflow activity of the related node.

Along with the generic process data table and the generic node data tables, the WDW may include at least one specific process data table and at least one specific node data table. Each specific process data table is configured to store process data that are specific to the execution of a particular sequence of workflow actions within a particular workflow process. Thus, this table is workflow model-specific. Each specific node data table is configured to store node data that are specific to the various node types. The two kinds of specific tables allow storage of attributes that are not included in the generic tables but that may be occasionally required for specific reporting needs. The specific process data table is linked to the generic process data table, while the specific node data table is linked to the generic node data table.

The WDW also includes at least one dimension table. Each dimension table stores data having a common attribute within the workflow process, such as a time attribute. Accordingly, each dimension table is a perspective of the workflow process under which the data can be analyzed. The dimension table is an outlying table within the star schema. In one embodiment, the dimension table is linked to both the generic process data table and the generic node data table. Alternatively, the dimension table is linked to one or more specific process data tables.

One possible dimension table is a behavior table which is configured to store data associated with identifying behaviors within the workflow process. A behavior dimension table is provided to enable a selection of a number of different behavior conditions for identifying a process instance which exhibits the selected behavior (e.g., supply chain process instances that last more than twenty days). The process instance may be an occurrence of an identified sequence or overall workflow process having the selected behavior. When the invention is implemented as a generalized software package, the behavior dimension table may be another "generic" table in which processes to be monitored and alternative behavior configuration parameters are stored in a behavior type-independent manner. The generic table should include many attributes, allowing a user to construct a variety of behavior types. If a particular parameter is meaningless for a behavior type, it can be left unspecified. The parameter labeling is then detected by executing searches (e.g., scripts) on warehouse data, with the results being stored in a process behavior table that couples the process instance identifiers with behavior identifiers.

While new behavior types may be entered by the user, a set of "built-in" open-parameter behavior types may be provided, such as "Processes lasting less (more) than x days and having less (more) than y activities." A correlation may be performed among behaviors to determine if a selected behavior condition has any effect upon other process instances. The correlating potentially enables a user to identify a cause-and-effect relationship within the workflow process.

As another aspect of the invention, the WDW in configured to store data that are associated with the modification of data within the workflow process. In particular, a modified process data table is provided to store data that are associated with the execution of a sequence of workflow actions that has been modified. A modified node data table is provided to store data that are associated with the execution of a node that has been modified. This aspect of the invention enables modifications to be recorded "vertically" in dedicated relations, so that the "width" of the process data tables and node data tables can be selected without concern for the number of modifications that can be detailed "horizontally."

An advantage of the invention is that efficient, high-performance analysis of workflow process execution data is enabled. The system provides a set of data structures that can be immediately used for queries and reporting, without the need of writing complex query statements. Moreover, the invention allows users to specify behaviors of interest and to analyze the causes of those behaviors without requiring data mining techniques and tools. The invention is also adaptable and scalable, since it uses "generic" tables that are model-independent, node-type independent, and behavior-type independent, but also uses "specific" tables that are directly related to the WFMS to which the WDW is coupled.

DETAILED DESCRIPTION

Figure 1:
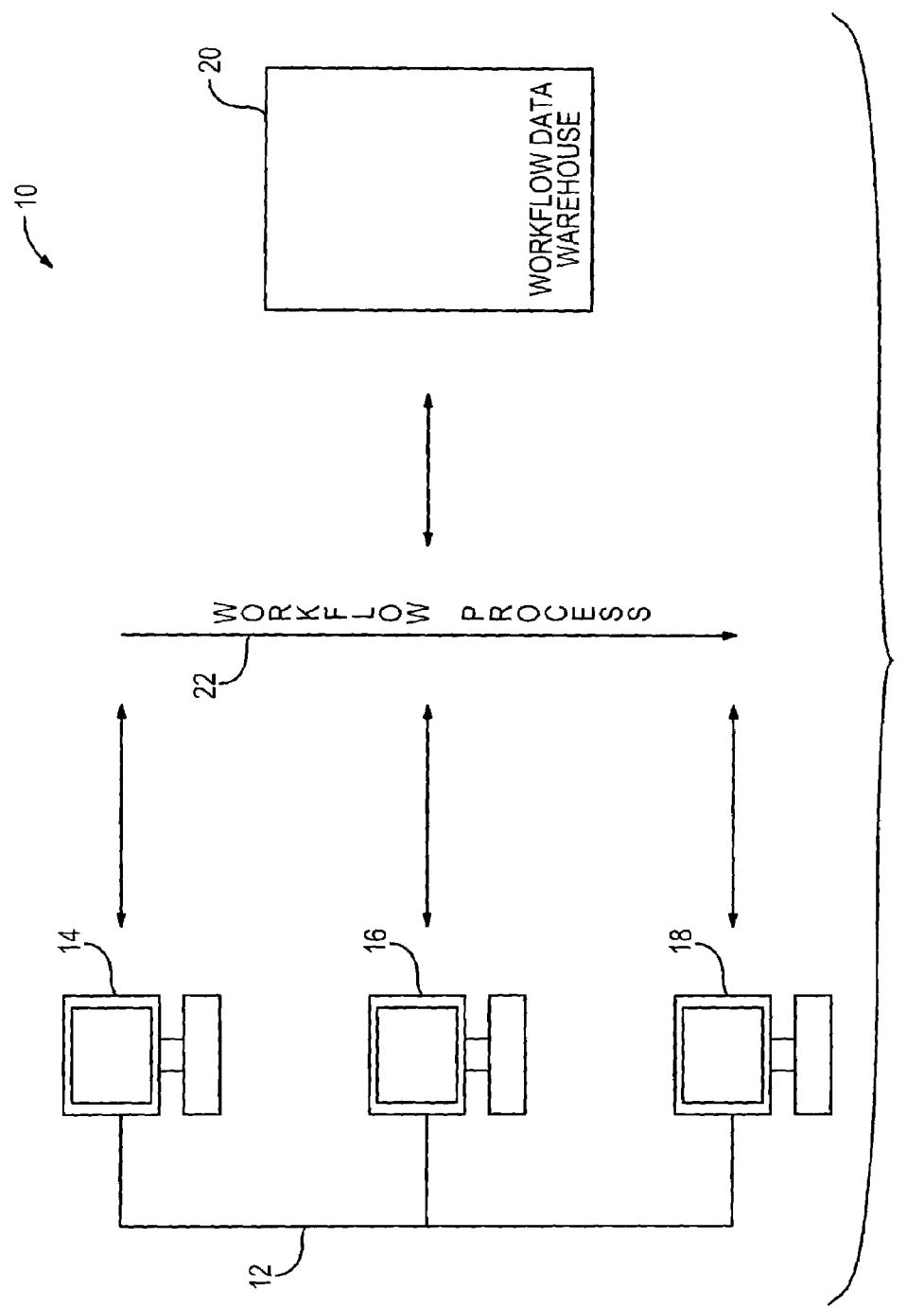
FIG. 1 is a workflow management system (WFMS) having a workflow data warehouse (WDW) in accordance with the invention.

FIG. 1 shows a block diagram of a workflow management system (WFMS) 10 for managing and controlling workflow process activities. The WFMS may be implemented in a network 12 of computer systems 14, 16 and 18. In an embodiment in which the network is the global communications network referred to as the Internet, the WFMS is enabled for on-line analytical processing (OLAP). The WFMS may be applied to other types of communications network, such as local-area networks (LANs) or wide-area networks (WANs), without diverging from the scope of the invention.

Each computer system 14, 16, or 18 of the WFMS 10 may be used to perform process steps of the WFMS and/or to enable a user, such as an information technology (IT) analyst, to manage and control workflow process activities. In accordance with the invention, the WFMS includes a workflow data warehouse (WDW) 20. The WDW is configured to track at least one workflow process 22 and to store data that are specific to the workflow process. In one embodiment, the WDW is a software package that can be loaded to cooperate with the Hewlett-Packard Process Manager (HPPM) or other commercially available process manager to provide a high performance solution for the management and control of workflow process data.

Figure 2:
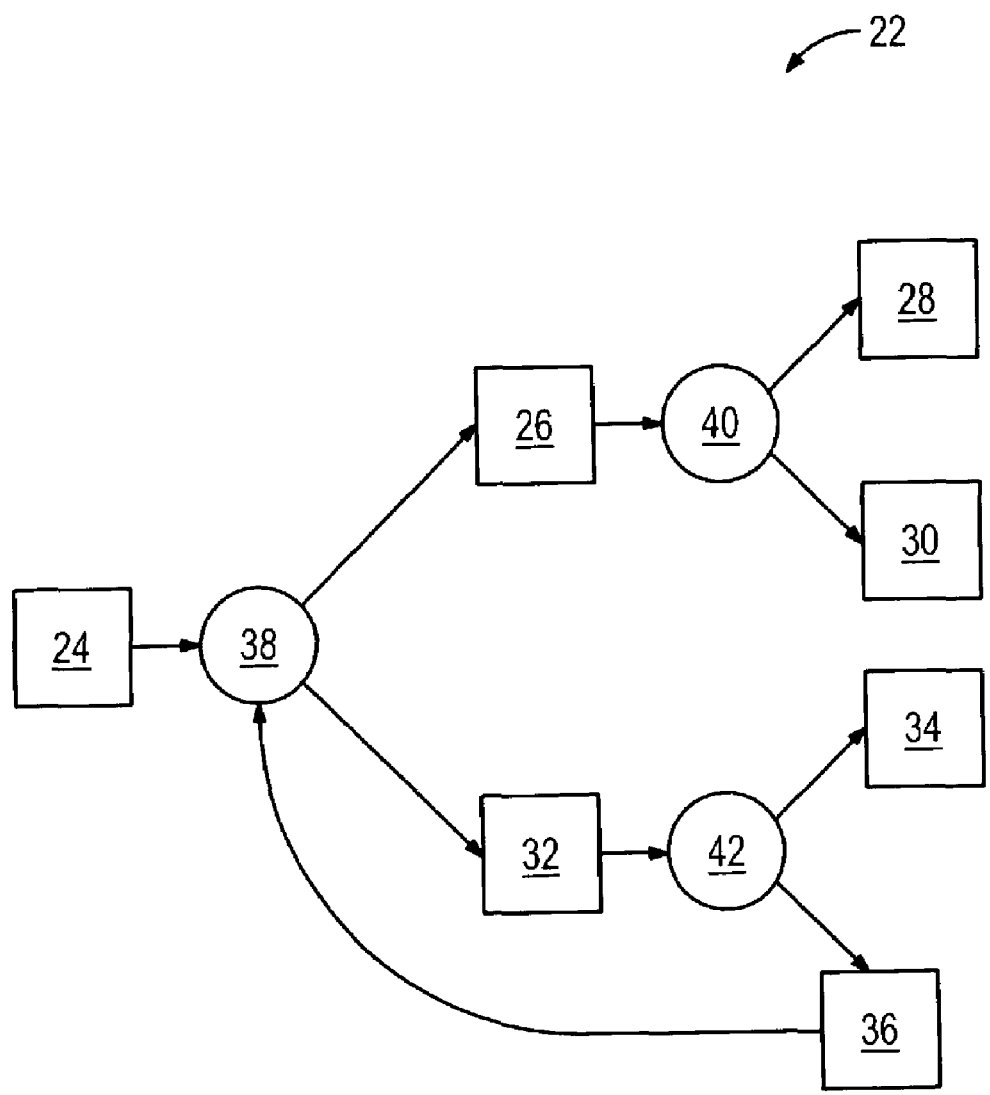
FIG. 2 is an exemplary workflow process model corresponding to the workflow process of FIG. 1.

In a workflow process model such as the workflow process 22 of FIG. 1, the model includes at least one sequence of workflow actions. A sequence of workflow actions may be configured as a number of nodes interconnected by arcs. Each node defines and executes a workflow action or step within the sequence of workflow actions. As one example, FIG. 2 shows the workflow process 22 as having work nodes 24, 26, 28, 30, 32, 34 and 36, which are shown as squares, and route nodes 38, 40 and 42, which are shown as circles. More complex workflow processes often include more than two types of nodes. Work nodes represent service activities to be performed. In a manufacturing environment, these service activities may include inputting data, executing a processing step in accordance with the data, and outputting data. Route nodes represent decision activities to be performed, including deciding which nodes should be executed next. In the workflow process 22 of FIG. 2, a workflow action may be defined by the node 28, while a sequence of workflow actions may be defined by the combination of nodes 26, 40 and 28.

Figure 3:
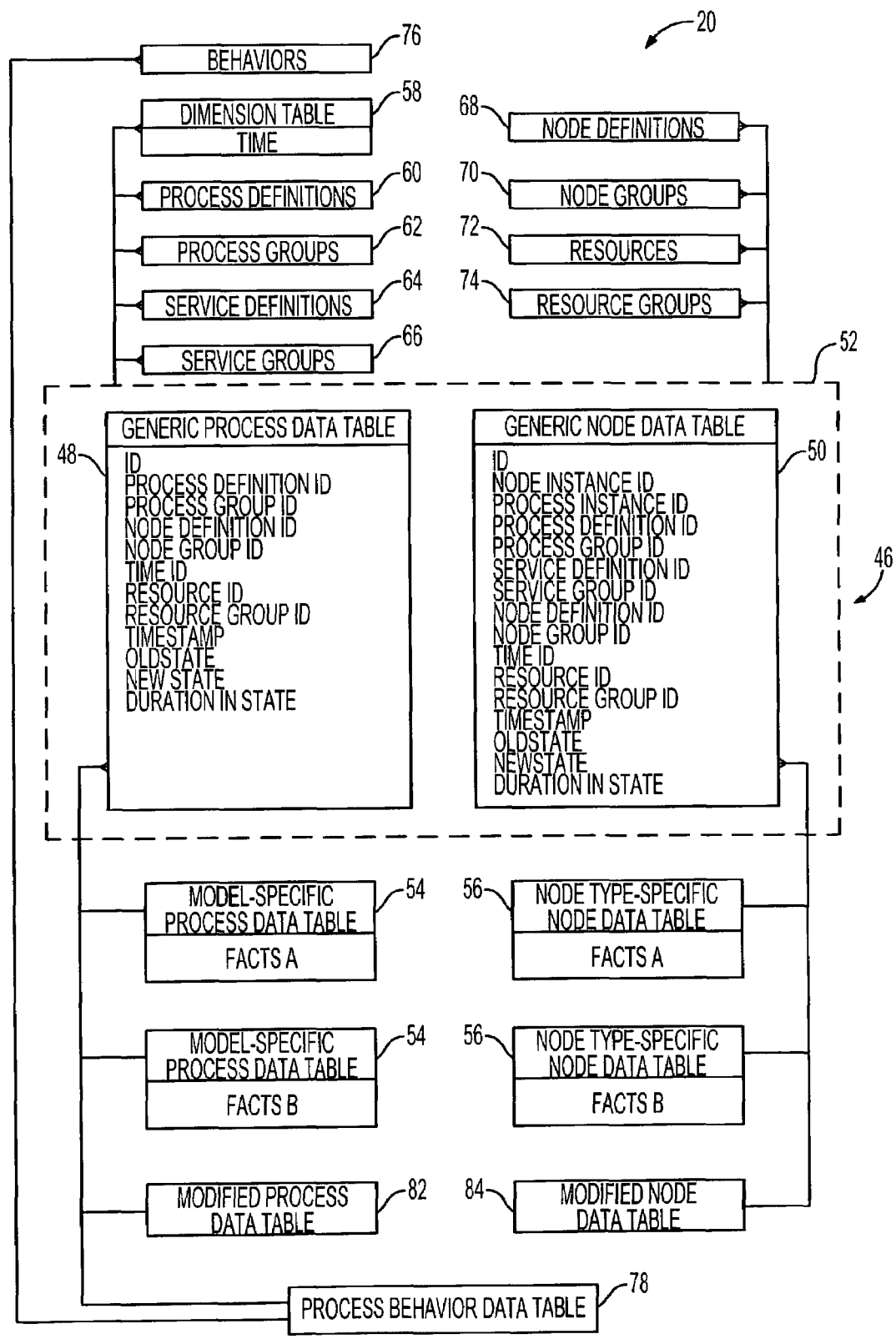
FIG. 3 is the WDW of FIG. 1 in accordance with one embodiment of the invention.

FIG. 3 shows the WDW 20 in accordance with one embodiment of the invention. The WDW includes multiple tables that are arranged within a star schema 46 for storing workflow process data, but data structures other than table structures may be used. The WDW includes a generic process data table 48 and a generic node data table 50 that are arranged as base tables within the star schema. The two base tables are shown as being enclosed within a dash block 52. As opposed to a conventional star schema having one base table, the present invention includes two base tables for organizing and storing facts that pertain to the workflow process 22. The difference between process data and node data will be readily understood by a person skilled in the art. Briefly, process data is relevant to the workflow process as a whole, or at the least one of the sequences that comprises a multi-sequence workflow process. In comparison, node data is relevant to a particular node. Since a sequence of workflow actions is comprised of a number of interconnected nodes, the node data is significantly more limited. Merely as an example, process data may list all of the vendors relevant to completion of a workflow process, while the node data that is stored regarding a particular node may identify only the vendor or possible vendors relevant to completion of the workflow action of that node.

The generic process data table 48 is configured to store "generic" process data. Generic process data include facts (or attributes) that are common to most workflow process models, as well as facts often needed to satisfy typical queries. Thus, the table 48 is "model-independent" ("model-neutral"). In the embodiment shown in FIG. 3, the general process data include: (1) Identity (ID) of the Workflow Process, (2) Process Definition ID, (3) Process Group ID, (4) Node Definition ID, (5) Node Group ID, (6) Time ID, (7) Resource ID, (8) Resource Group ID, (9) Time Stamp, (10) Old State, (11) New State, and (12) Duration In State. The listed process data that are stored in the generic process data table 48 are shown only as examples. Other types of commonly used or required process data may be included in the generic process data table without diverging from the scope of the invention.

The generic process data are stored in the generic process data table 48 only upon completion of the sequence of workflow actions. As an example, with reference to FIG. 2, if a sequence of workflow actions is associated with nodes 26, 40 and 28, data corresponding to the sequence of workflow actions are stored in the generic process data table only upon completing the execution of the last node 28 in the sequence of nodes.

The generic node data table 50 is configured to store generic node data. Generic node data include facts (or attributes) that are common to the various node types that are encountered within different workflow processes, as well as facts or attributes often needed to satisfy typical queries. Therefore, the table 50 is "node type-independent" ("type-neutral"). In one application, the generic node data table is enabled to store node data that are common to the execution of the work nodes 24-36 and the route nodes 38-42 of FIG. 2. In the embodiment shown in FIG. 3, the generic node data include: (1) Identity (ID) of the Node, (2) Node Instance ID, (3) Process Instance ID, (4) Process Definition ID, (5) Process Group ID, (6) Service Definition ID, (7) Service Group ID, (8) Node Definition ID, (9) Node Group ID, (10) Time ID, (11) Resource ID, (12) Resource Group ID, (13) Time Stamp, (14) Old State, (15) New State, and (16) Duration In State. The listed generic node data that are stored in the generic node data table are shown only as examples. Other types of commonly used or required node data may be included in the generic node data table without diverging from the scope of the invention.

The generic node data are stored in the generic node data table 50 only upon completion of the workflow action(s) associated with the execution of the node within the workflow process. As an example, with reference to FIG. 2, if the node 28 is associated with one workflow action, data corresponding to the node are stored in the generic node data table only upon completion of the workflow action.

Many data aggregations and reports can be computed based on the two generic tables 48 and 50. One consequence is that view definitions are simplified. Moreover, often process results can be computed without the need to join several tables.

Data tables that are specific to a workflow process model or specific to node types and that are occasionally required for specific reporting needs are also included within the WDW 20 of FIG. 3. In one embodiment, the WDW includes model-specific process data tables 54 and node-type specific node data tables 56. Each specific process data table 54 is configured to store specific process data. Specific process data include facts or attributes that are occasionally required for particular reporting needs with respect to the execution of the sequence of workflow actions within the workflow process 22. The specific process data that are stored in the specific process data tables 54 are not included in the generic process data table 48. However, the specific process data table 54 is linked to the generic process data table 48.

The node-type specific node data table 56 is configured to store node data that are related to a node. Therefore, the type-specific table 56 will identify a node as a work node, a route node, or another type of node. The table will also include such attributes as the decision rules that are applicable to a rule node. The two kinds of specific tables 54 and 56 allow storage of attributes that are occasionally needed for particular reporting needs.

The specific node data that are stored in the specific node data table 56 are not included in the generic node data table 50, but the specific node data table 56 is linked to the generic node data table 50. By storing facts or attributes that are occasionally required for specific reporting needs in independent tables separated from the two base tables (i.e., generic process data table 48 and generic node data table 50), the need to sort through all the data within the tables is eliminated.

The WDW 20 of FIG. 3 also includes at least one dimension table 58. Each dimension table is an outlying table within the star schema 46. Each dimension table is configured to store data having a common attribute within the workflow process 22 (FIG. 1). Accordingly, with regard to the common attribute, each dimension table is a perspective of the workflow process under which the data can be analyzed. As shown in FIG. 3, the dimension table 58 is a time dimension table. The time dimension table may include data specific to the timing of the workflow process. The time dimension table is linked to the two base tables, i.e., the generic process data table 48 and the generic node data table 50. Accordingly, the time dimension table may include timing data that are specific to the execution of a sequence of workflow actions within the workflow process and data that are specific to the execution of a node within the workflow process, as long as the data include a common attribute. The WDW may include other dimension tables in addition to the time dimension table 58. Possibilities include: (1) process definitions dimension table 60, (2) process groups dimension table 62, (3) service definitions dimension table 64, (4) service groups dimension table 66, (5) node definitions dimension table 68, (6) node groups dimension table 70, (7) resource dimension table 72, and (8) resource groups dimension table 74.

Figure 4:
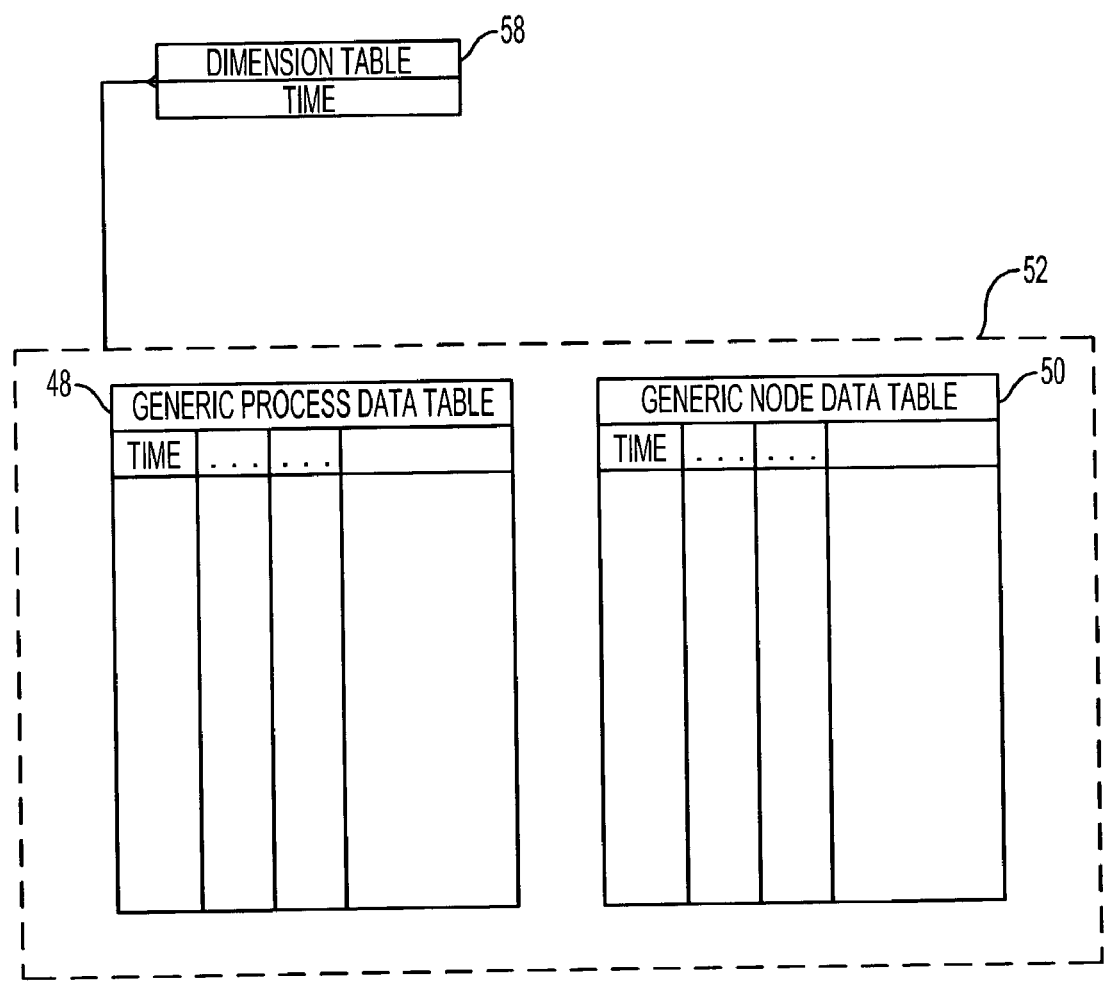
FIG. 4 shows a time dimension table of the WDW of FIG. 3 having a corresponding "time" column in both the generic process data table and the generic node data table.

In one embodiment, each of the dimension tables 58-74 is linked to the two base tables (generic process data table 48 and generic node data table 50) such that the base tables include columns that are associated with the different common attributes of the various dimension tables 58-74. FIG. 4 shows the time dimension table 58. Corresponding "time" columns are found in the generic process data table 48 and the generic node data table 50. While not shown, each dimension table has a corresponding "attribute" column in each of the two base tables. In another embodiment, a dimension table is linked to a table other than the generic process data table 48 and the generic node data table 50.

The WDW 20 of FIG. 3 may be configured to store data that are associated with identifying a behavior of interest within the workflow process 22. An example of such a behavior is a supply chain process that lasts for more than 20 days. Another example is an ordering process that is related to the ordering of goods that exceed $20,000. The WDW enables a user to define a behavior condition for identifying a process instance having the selected behavior. The process instance may be a node, sequence, and/or process exhibiting the selected behavior.

The behavior condition may be defined by Boolean conditions over the WDW data, including process data (generic process data and specific process data), node data (generic node data and specific node data), and data stored within the dimension tables. The behavior condition for identifying the behavior is parametric. A node, sequence, or process having the selected behavior in which the behavior condition is "true" is considered as being affected by the behavior. For instance, a process duration behavior may be defined as "an instance of a process definition PD that lasts more than D days." In this case, PD and D are parameters for identifying which processes should be monitored and the exact behavior to be detected. Multiple behaviors to be monitored (on different processes) can be defined for each behavior condition. In one implementation, behavior conditions are defined by structured query language (SQL) scripts that identify the selected behaviors.

The behavior conditions are stored in a behavior dimension table 76 of FIG. 3. When the WDW is implemented as a generalized software package for use with different WFMSs and for application to various workflow processes, the table 76 may be another "generic" table. That is, the table may be constructed in a manner that is not related to any specific behaviors. The generic table should store a wide range of attributes, allowing users to configure a variety of behavior types. Then, if a parameter is meaningless within a given application, the parameter is left unspecified. The generalized software package may also include a set of built-in behavior types which a user can select. An example may be the identification of processes lasting more (or less) than a specified duration, being in the slowest (or fastest) x%, including more (or less) than n activations of a specific work node WN, or in which work node WN has (or has not) been executed by a resource group G. If a behavior condition is not included in the behavior dimension table, the user can define a new behavior condition by simply providing a corresponding script. Result data that are identified as corresponding to the behavior condition are detected by executing the scripts on the WDW data. The result data are associated with the process instance exhibiting the selected behavior. The result data are stored in a process behavior data table 78 of FIG. 3. The process behavior data table is a specific process fact table that is linked to the generic process data table 48 and to the behavior dimension table 76.

Figure 5:
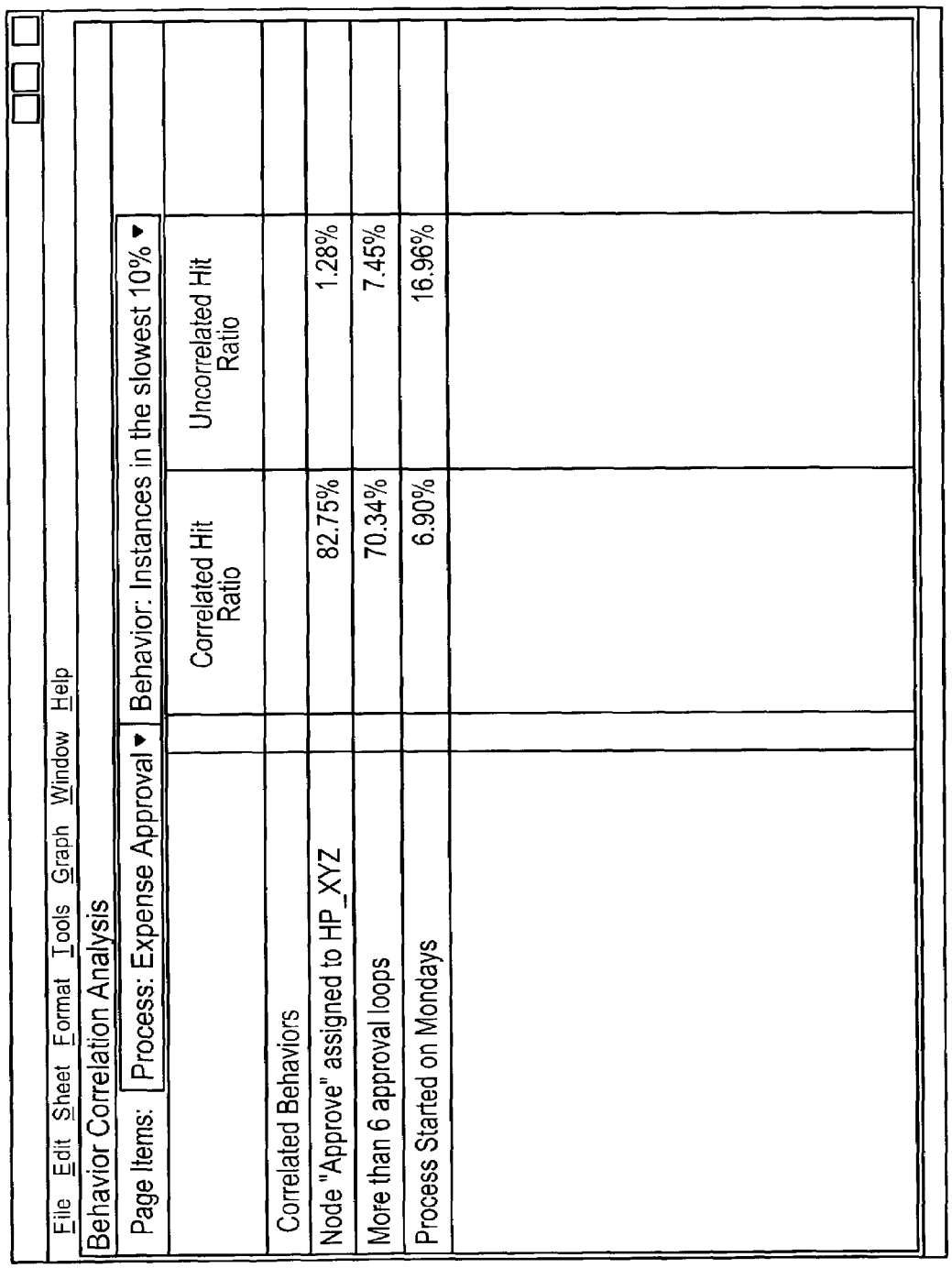
FIG. 5 shows a report illustrating which other behaviors are affected by a selected behavior condition in accordance with the WDW of FIG. 3.

By detecting behaviors of interest, the user can perform analysis to understand the causes of "good" and "bad" workflow process executions, and take appropriate actions. In particular, a very useful analysis includes examining correlations among behaviors. The WDW approach is associated with a set of views that supports users in this analysis. FIG. 5 shows a report 80 built with a reporting tool through a simple projection query on a WDW view. The report shows the analysis for a behavior condition B of a process duration type that is configured to detect instances in the slowest 10% for an expense approval process. The report shows which other behaviors were detected in instances affected by the behavior condition B, and shows the correlated and uncorrelated hit rates. This type of analysis is very useful in detecting a cause-and-effect relationship among behaviors.

As another aspect of the invention, the WDW 20 of FIG. 3 is configured to store data that are associated with the data modification of the workflow process 22. The modification of WDW data can be of interest to the user. For instance, the user may want to generate data related to the purchase of vehicles costing over $20,000. The modified data are not stored in the generic process data table 48 or the generic node data table 50. Rather, the modification is recorded in the specific data table or other data structure having additions that are recorded vertically. As shown in FIG. 3, data modifications that are associated with the execution of a sequence of the workflow process 22 are stored in a modified process data table 82. The modified process data table 82 is linked to the generic process data table 48. Similarly, data modifications that are associated with the execution of a node within the workflow process are stored in a modified node data table 84. The modified node data table 84 is linked to the generic node data table 50. The data modifications that are stored in the modified process data table 82 and the modified node data table 84 are arranged in tuples (i.e., rows within the tables) detailing (1) the process or node state changes which resulted from the data modifications, (2) the data item name, and (3) the old and new values. While the modified process data table 82 and the modified node data table 84 may store all of the data associated with the modification, the user can selectively specify which data associated with the modification are to be stored.

Figure 6:
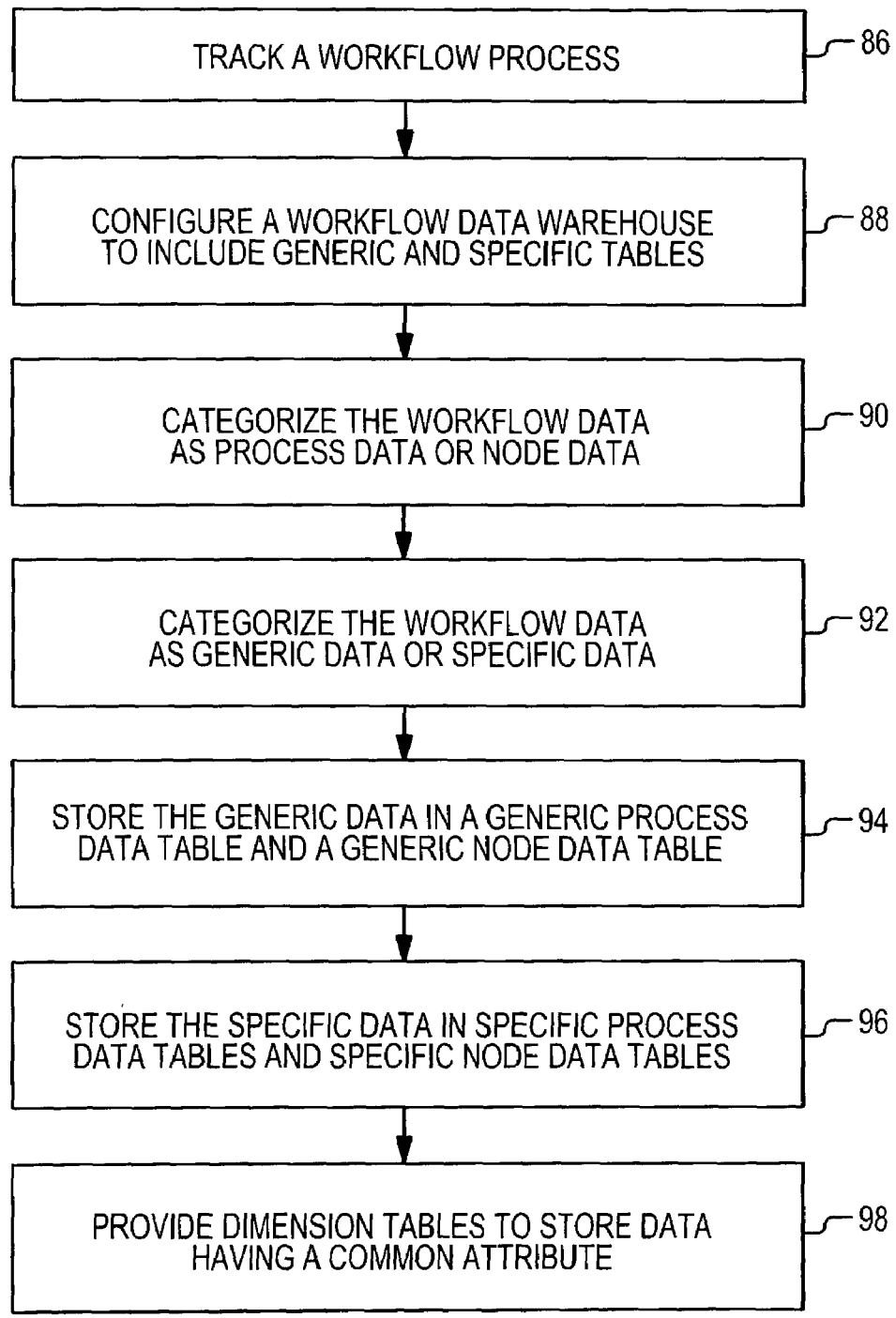
FIG. 6 is a process flow diagram for managing data in accordance with the WDW of FIG. 3.

The method for managing data is described with reference to the process flow diagram of FIG. 6, the WFMS 10 of FIG. 1, and the WDW 20 of FIG. 3. In step 86, a workflow process 22 is tracked (i.e., identified). The workflow process is defined by at least one sequence of workflow actions. In steps 88 and 90, a WDW 20 is formed to include generic and specific tables and to store data related to the workflow process, including categorizing the data as process data or node data. The process data are related to the execution of a sequence of workflow actions within the workflow process. The node data are indicative of facts related to the nodes within the workflow process.

In step 92, the workflow data are categorized as being either "generic" or "specific" (i.e., generic or specific with regard to process model or with regard to node type). Then, at step 94, the generic process data are stored in a generic process data table 48, while the generic node data are stored in a generic node data table 50. The generic process data table and the generic node data table are base tables within a star schema 46 of the workflow data warehouse.

In step 96, the specific process data are stored in the specific process data table or tables, while specific node data are stored in the specific node data table or tables.

At step 98, the dimension tables are provided. Each dimension table is configured to store data having a common attribute within the workflow process. The dimension table is an outlying table within the star schema. As previously described, the behavior table 76 may be particularly useful to analysts who employ a WDW of the type shown in FIG. 3.

What is claimed is:

1. A method for managing data comprising:
   executing an established workflow process, said workflow process being defined by at least one sequence of workflow actions, said workflow actions being determined at various nodes;
   forming a workflow data warehouse (WDW) that monitors executions of said workflow process and systematically stores workflow data generated during said executions of said workflow process, including categorizing said workflow data as process data and as node data and further including storing said process data in a first data structure different than a second data structure for storage of said node data, said process data being data generated during said executions and relevant to each said node of said sequence of workflow actions within said workflow process, said node data being data generated during said executions and related to individual said nodes within said workflow process, wherein said first and second data structures are both base data structures in a relational schema of data structures within said WDW, such that said first and second data structures are co-base level data structures in said relational schema;
   defining a star schema in which said first data structure is a generic process data structure and said second data structure is a generic node data structure to define two separate base data structures;
   identifying generic process data as portions of said process data that are common in various models of workflow processing, such that said generic process data are generally model-independent;
   storing said generic process data in said generic process data structure only upon completions of said sequence of workflow actions to which said generic process data is relevant;

identifying generic node data as portions of said node data that are common to various types of said nodes, such that said generic node data are generally node-type independent; and storing said generic node data in said generic node data structure.

2. The method of claim 1 wherein forming said WDW further includes designating portions of said workflow data that are commonly used in workflow processing queries as one of said generic process data and said generic node data to be respectively stored in said generic process data structure and said generic node data structure, each of said data structures being a separate data table in said star schema.

3. The method of claim 1 wherein forming said WDW further includes:

providing a specific process data table and a different specific node data table within said star schema;

identifying portions of said process data that are specific to a model of said workflow process as specific process data;

storing said specific process data in said specific process data table;

identifying portions of said node data that are specific to a type of said nodes as specific node data; and storing said specific node data in said specific node data table.

4. The method of claim 3 wherein forming said WDW further includes excluding said specific process data from being stored with said generic process data structure and excluding said specific node data from being stored with said generic node data structure, said data structures defining generic data tables.

5. The method of claim 4 wherein forming said WDW further includes linking said specific process data table and said specific node data table to said generic data tables.

6. The method of claim 1 wherein forming said WDW further includes providing at least one dimension table, each said dimension table being configured to store a portion of said workflow data having a common attribute within said workflow process, said dimension table being an outlying table within the star schema of tables defined by said WDW.

7. The method of claim 1 wherein forming said WDW further includes storing data that are associated with identifying behaviors within said execution of said workflow process, including storing a plurality of behavior conditions in a behavior dimension table so as to enable a selection of a said behavior condition for identifying process instances within said executions of said workflow process, wherein said identified process instances exhibit said selected behavior condition, said behavior dimension table being a data structure in said star schema and being separate from said first and second data structures.

8. The method of claim 7 wherein forming said WDW further includes providing a process behavior data table configured to store behavior search results that identify said process instances.

9. The method of claim 8 wherein forming said WDW further includes correlating among said behaviors to determine if said selected behavior condition is related to other behavior conditions with respect to said process instances.

10. The method of claim 1 wherein forming said WDW further includes providing a modified process data table and a modified node data table, said modified process data table and modified node data tables being data structures in said star schema and being separate from said first and second data structures, said modified process data table being configured to store data that are associated with execution of a sequence of workflow actions that has been modified, said modified node data table being configured to store data that are associated with execution of a node that has been modified.

11. The method of claim 1 further comprising coupling said WDW with a workflow management system (WFMS) such that said WDW is enabled for on-line analytical processing (OLAP).

12. A method of managing data associated with a processing environment comprising:

(A) defining a relational schema for automated manipulation of data associated with executions of any of a plurality of workflow processing models having varying types of activity nodes, said relational schema including different data structures for each of:

(1) first process-related data that are common to a majority of said workflow processing models, such that a first said data structure for organizing and storing said first process-related data is generally model-neutral;

(2) first node-related data that are common to a majority of said types of said activity nodes, such that a second said data structure for organizing and storing said first node-related data is generally node type-neutral;

(3) second process-related data, such that a third said data structure is configurable by a user to be specific to a particular workflow process for organizing and storing said second process-related data; and (4) second node-related data, such that a fourth said data structure is configurable by said user to be specific to node types of said activity nodes of said particular workflow process, said fourth data structure thereby being configured for organizing and storing said second node-related data;

wherein said first, second, third and fourth data structures are linked within said relational schema but are independently accessible for satisfying user queries; and (B) coupling said relational schema to at least one workflow management system (WFMS) which defines and executes workflow processing, such that said different data structures are responsive to executions of said workflow processing with respect to storing said first and second process-related data and said first and second node-related data.

13. The method of claim 12 wherein defining said relational schema includes establishing said data structures as individual tables in which said first and second data structures are base tables and in which said third and fourth data structures are respectively linked to said first and second data structures.

14. The method of claim 12 wherein said different data structures are formed to include a behavior table which is configured to enable identification of behaviors exhibited during executions of said workflow processing.

15. The method of claim 14 wherein including said behavior table involves forming a table for storing a set of attributes that enables said user to selected any of a wide variety of behavior types for which queries written for said behavior types are satisfied by accessing said attributes.

16. A data management system for coupling to a workflow management system (WFMS) comprising:

a workflow data warehouse (WDW) for storing data during executions of a workflow process, said WDW having:

a first generic facts data structure configured to store and to indicate generic process data common to generation during execution of a variety of said workflow processes;

a second generic facts data structure configured to store and indicate generic node data that are common to types of nodes which are included within said variety of workflow processes; and a plurality of dimension data structures, each said dimension data structure being configured to indicate dimension data for a designated common attribute associated with and exhibited during executing said workflow processes, at least a portion of said dimensional data being specific to behavioral conditions exhibited during completions of executions of said workflow process, wherein each of said first and second generic data structures and said dimension data structures is a component within a star schema of data structures in which each of said first and second generic facts data structures is a base level data structure, each dimension data structure being dependent from one of said base level data structures;

a first specific facts table configured to indicate specific process data that are specific to execution of a particular said workflow process, said particular workflow process being determined by said WFMS, said first specific facts table being linked to said first generic facts data structure, said first generic facts data structure being a table and being exclusive of said specific process data; and a second specific facts table configured to indicate specific node data that are specific to said node types of said particular workflow process, said second specific facts table being linked to said second generic facts data structure, said second generic facts data structure being a table and being exclusive of said specific node data.

17. The system of claim 16 wherein at least one of said dimension data structures is linked to both said first generic facts table and said second generic facts table.

18. The system of claim 16 wherein at least one of said dimension data structures is a behavior dimension table configured to enable queries of a plurality of behavior conditions, thereby enabling a selection of said behavior conditions to identify process instances exhibiting said selected behavior conditions.

19. The system of claim 16 further comprising a modified process facts data structure and a modified node facts data structure, said modified process facts data structure being configured to indicate data modifications that are associated with execution of said workflow process, said modified node facts data structure being configured to indicate data modifications that are associated with execution of said nodes.

* * * * *